United States Patent Office 3,786,023
Patented Jan. 15, 1974

3,786,023
FLAME-RETARDANT COMPOSITIONS
Anderson O. Dotson, Jr., New Brunswick, and Jack Newcombe and Lionel T. Wolford, Freehold, N.J., assignors to Cities Service Company, New York, N.Y.
No Drawing. Filed July 24, 1972, Ser. No. 274,557
Int. Cl. C08f 45/56, 45/62
U.S. Cl. 260—45.75 B                               9 Claims

ABSTRACT OF THE DISCLOSURE

Polypropylene is rendered flame retardant by the incorporation of N,N'-hexane-1,6-bis(5,6-dibromonorbornane-2,3-dicarboximide). If desired, the flame retardancy may be enhanced with synergists, such as certain metal compounds (e.g., antimony trioxide) and certain organic phosphites (e.g., distearyl pentaerythritol diphosphite).

BACKGROUND OF THE INVENTION

Field of the invention

This invention relates to flame-retardant polypropylene compositions and more particularly relates to such compositions containing a novel halogenated organic flame retardant.

Description of the prior art

It is known that halogenated compounds are sometimes useful for imparting flame retardancy to polypropylene. However, known flame retardants frequently have one or more of the following disadvantages: volatility, instability at the temperatures normally used to process polypropylene, incompatibility with polypropylene, too high a melting point for ready dispersion in polypropylene, the high concentrations at which they must be employed to impart an adequate level of flame retardancy, and the degradation of physical properties which they cause when incorporated in polypropylene at these high concentrations.

SUMMARY OF THE INVENTION

An object of this invention is to provide a self-extinguishing polypropylene composition containing a novel flame retardant.

Another object is to provide such a composition wherein the flame retardant has desirable properties of stability, dispersibility, compatibility, efficiency, and non-volatility.

These and other objects are attained by intimately mixing polypropylene with N,N'-hexane-1,6-bis(5,6-dibromonorbornane-2,3-dicarboximide) as the flame retardant.

DESCRIPTION OF THE PREFERRED EMBODIMENTS

The flame retardant of the invention is N,N'-hexane-1,6-bis(5,6-dibromonorbornane-2,3-dicarboximide), i.e.,

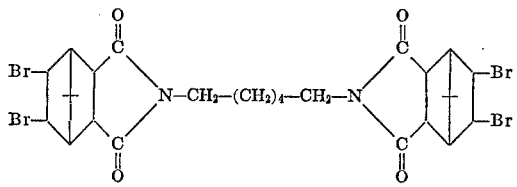

This compound may be prepared by reacting two molar proportions of 5,6-norbornene-2,3-dicarboxylic acid anhydride with one molar proportion of hexamethylene diamine in a suitable solvent or solvent mixture under reflux conditions, removing the solvent and water of reaction, and reacting the product with bromine in a suitable solvent under reflux conditions. The brominated product has a melting point of about 248–250° C. but may be used in a less pure form having a different melting point, e.g., about 245–248° C.

Since the flame retardant is unusually efficient, it is normally used at relatively low concentrations, e.g., about 2–25%, preferably about 3–20%, based on the weight of the composition. To reduce the amount of flame retardant required to achieve a desired level of flame retardancy, it is frequently desirable to employ a synergist for the flame retardant, e.g., a free radical-generating compound such as dicumyl peroxide, a conventional metal compound synergist, or a phosphite corresponding to the formula P(QR)(QR')(QR'') wherein Q is oxygen or sulfur, R and R' are aliphatic or cycloaliphatic radicals, and R'' is an aliphatic, cycloaliphatic, or aromatic radical.

Ordinarily, the synergist, when employed, is any of the metal compounds conventionally used as synergists for halogenated flame retardants. Thus, it may be an organometallic compound but is usually an oxide or sulfide of a polyvalent metal such as antimony, arsenic, bismuth, tin, or titanium. Of such compounds, antimony trioxide is preferred. This type of synergist is normally employed in a concentration of about 20–100%, preferably about 50%, based on the weight of the flame retardant.

A phosphite used as a synergist may be any compound corresponding to the above formula but is generally such a compound containing 1–7 phosphorus atoms and 6–60 carbon atoms per phosphorus atom. Exemplary of such phosphites are tridecyl phosphite, trilauryl trithiophosphite, tricetyl trithiophosphite, tristearyl phosphite, distearyl pentaerythritol diphosphite, diisodecyl pentaerythritol diphosphite, poly(bisphenol A pentaerythritol diphosphite) having a degree of polymerization of at least two, and bis(neopentyl glycol) 1,4-cyclohexanedimethylene phosphite. Distearyl pentaerythritol diphosphite is preferred. This type of synergist is normally employed in a concentration of about 3–100%, based on the weight of the flame retardant.

If desired, two or more synergists of the same or different types may be employed.

The flame retardant compositions of the invention are prepared by intimately mixing the polypropylene with the flame retardant and optionally also with other additives, such as synergists, fillers, pigments, plasticizers, stabilizers, and antioxidants, in any suitable manner. For example, the ingredients may be mixed on a two-roll mill or in an extruder or Banbury mixer.

The invention is advantageous in that the flame retardant has low volatility, is stable at polypropylene processing temperatures, is readily dispersible in polypropylene, is compatible with polypropylene, and is effective at sufficiently low concentrations to minimize degradation of physical properties.

The following examples are given to illustrate the invention and not intended as a limitation thereof. Unless otherwise specified, quantities mentioned are quantities by weight.

EXAMPLE I

Part A

Charge a suitable reaction vessel with 656 g. of 5,6-norbornene-2,3-dicarboxylic acid anhydride, 1.6 liters of toluene, and 480 g. of acetic acid. Add a solution of 232 parts of hexamethylene diamine in 600 cc. of toluene over a period of one hour at 35° C. Heat to reflux, and reflux for two hours. Remove the water of reaction and 1.5 liters of the solvent by distillation. Cool the reaction mixture to ambient temperature and filter to obtain 634 g. of N,N'-hexane-1,6-bis(5,6-norbornene-2,3-dicarboximide). Evaporate the solvent to obtain an additional 150 g. of product.

Part B

Treat 0.074 mol of the product of Part A with 0.148 mol of bromine in 140 g. of benzene at 50° C. for 1.5 hours. Cool the reaction mixture to ambient temperature, filter, wash the crude product twice with 75 cc. portions of benzene, and dry. The process results in the formation of 48.8 g. of N,N'-hexane-1,6-bis(5,6-dibromonorbornane-2,3-dicarboximide) having a bromine content of 44%, a melting point of 248–250° C., and a volatility of only 0.33% when placed in a forced air driven oven at 160° C. for 7 days.

Part C

Blend 5 parts of the product of Part B with 92.5 parts of polypropylene and 2.5 parts of antimony trioxide. Mold the blend into test specimens. Test the specimens for oxygen index in accordance with ASTM procedure D–2863. The blend has an oxygen index of 27.2.

EXAMPLE II

Repeat Example I, Part C, except for replacing the antimony trioxide with distearyl pentaerythritol diphosphite. Similar results are observed.

It is obvious than many variations may be made in the products and processes set forth above without departing from the spirit and scope of this invention.

What is claimed is:

1. A flame-retardant polypropylene composition containing 2–25% by weight of N,N'-hexane-1,6-bis(5,6-dibromonorbornane-2,3-dicarboximide) as the flame retardant.
2. The composition of claim 1 containing about 3–20% by weight of the flame retardant.
3. The composition of claim 1 containing a synergist.
4. The composition of claim 3 wherein the synergist is an oxide or sulfide of antimony, arsenic, bismuth, tin, or titanium.
5. The composition of claim 4 wherein the synergist is antimony trioxide.
6. The composition of claim 4 containing about 20–100% by weight of the synergist, based on the weight of the flame retardant.
7. The composition of claim 6 containing about 50% by weight of the synergist, based on the weight of the flame retardant.
8. The composition of claim 3 wherein the synergist is a phosphite corresponding to the formula $$P(QR)(QR')(QR'')$$

wherein Q is oxygen or sulfur, R and R' are aliphatic or cycloaliphatic radicals, and R'' is an aliphatic, cycloaliphatic, or aromatic radical; said phosphite containing 1–7 phosphorus atoms and 6–60 carbon atoms per phosphorus atom.

9. The composition of claim 8 wherein the synergist is distearyl pentaerythritol diphosphite.

References Cited

UNITED STATES PATENTS

| | | | |
|---|---|---|---|
| 3,403,036 | 9/1968 | Hindersinn | 260—45.75 B |
| 3,039,993 | 6/1962 | Friedman | 260—45.7 P |

FOREIGN PATENTS

| | | | |
|---|---|---|---|
| 6709995 | 11/1968 | Netherlands | 260—326 C |

DONALD E. CZAJA, Primary Examiner

W. E. PARKER, Assistant Examiner

U.S. Cl. X.R.

260—45.7, 45.8, 326